No. 744,759. PATENTED NOV. 24, 1903.
T. H. HICKS.
MACHINE FOR RECOVERING MERCURY AND AMALGAM FROM ORES.
APPLICATION FILED FEB. 14, 1902.
NO MODEL. 2 SHEETS—SHEET 1.

WITNESSES:
Thomas H. Hicks INVENTOR
BY A. J. Burns
ATTORNEY.

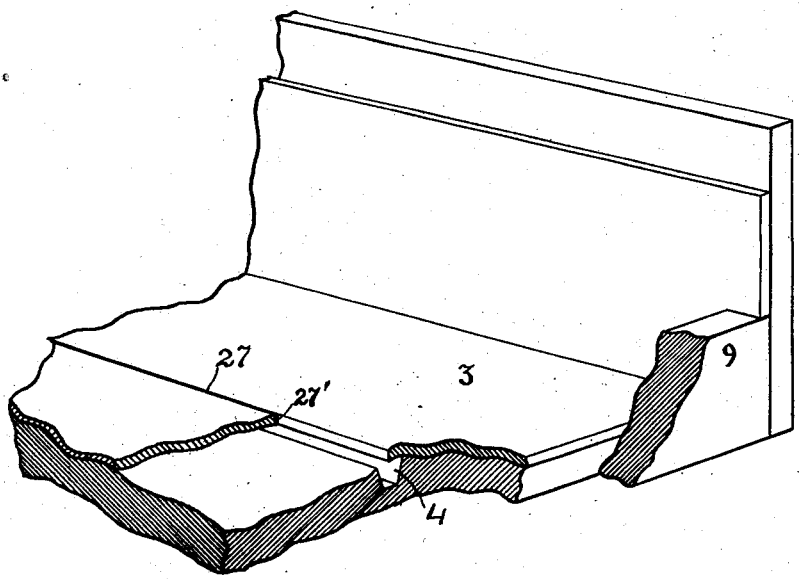

No. 744,759. Patented November 24, 1903.

UNITED STATES PATENT OFFICE.

THOMAS H. HICKS, OF FORT WAYNE, INDIANA, ASSIGNOR TO THE HICKS GOLD AND SILVER EXTRACTION COMPANY, A CORPORATION OF GEORGIA.

MACHINE FOR RECOVERING MERCURY AND AMALGAM FROM ORES.

SPECIFICATION forming part of Letters Patent No. 744,759, dated November 24, 1903.

Application filed February 14, 1902. Serial No. 94,086. (No model.)

*To all whom it may concern:*

Be it known that I, THOMAS H. HICKS, a subject of the King of Great Britain, residing at Fort Wayne, in the county of Allen and State of Indiana, have invented certain new and useful Improvements in Machines for Recovering Mercury and Amalgam from Ores; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in machines for recovering mercury and amalgam from ore; and the object of my improvements is to afford means to effect coalescence and recovery of floured mercury and amalgam and to separate the recovered mercury from the amalgam.

I accomplish my object by the construction illustrated in the accompanying drawings, in which—

Figure 1:
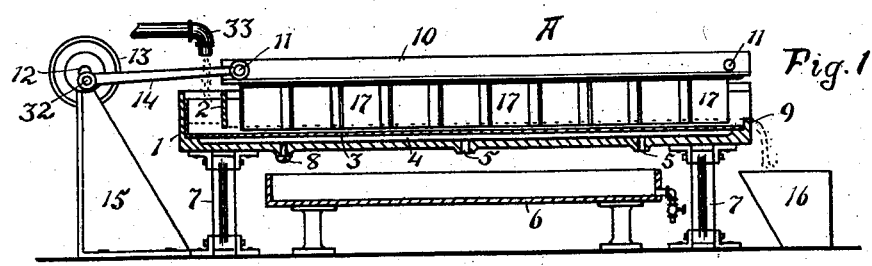
Figure 2:
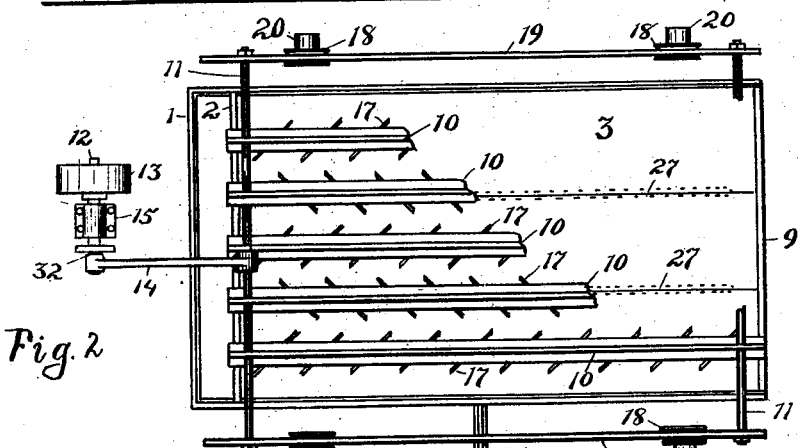
Figure 3:
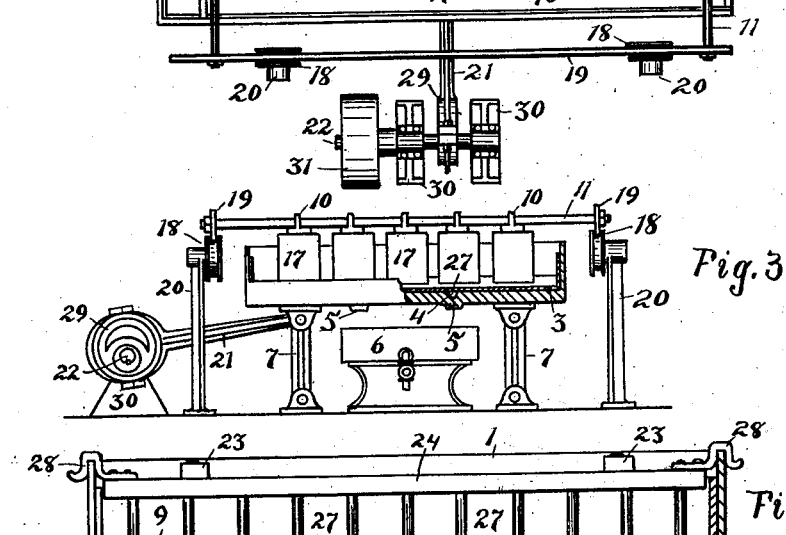
Figure 4:
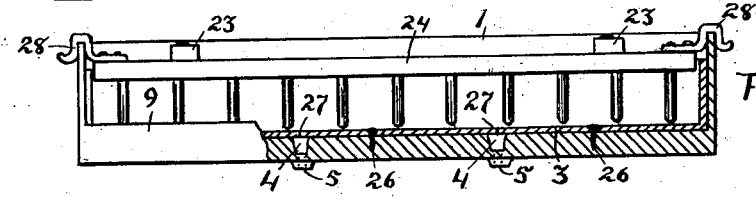

Figure 1 is a longitudinal sectional view. Fig. 2 is a plan showing the agitator partly cut away. Fig. 3 is an end elevation showing part in section. Fig. 4 is an end elevation of the pan, partly in section, showing a modified form of agitator; and Fig. 5 is a detail, on an exaggerated scale, showing amalgam 27' in the joint 27.

Similar letters and numerals of reference indicate corresponding parts throughout the several views, and referring now to the same, 1 is a pan mounted upon supports 7, which are arranged to oscillate, whereby said pan may be moved reciprocally. An amalgamated lining 3, such as a copper plate coated with mercury, is secured in the bottom of the pan. The said lining has one or more closely-fitted joints 27, which are amalgamated, and thereby forms an easy passage-way for mercury. Grooves 4 are made in the pan 1, which range under said joints, and suitable discharge-openings 5 lead from said grooves through the bottom of said pan. The said openings are arranged so they may be closed, as by a plug 8.

A gate 2 is arranged at the inlet end of the pan 1, so that ore and water can pass under it, and a dam 9 is arranged at the outlet end of the pan.

The pan 1 is arranged to be shaken reciprocally by any suitable means, as by an eccentric 29, mounted upon a shaft 22, which shaft is mounted in bearings 30 and is driven by a pulley 31, mounted thereon.

A is an ore-agitator, and it consists of a number of bars 10, to which are secured a number of blades 17. The said bars are supported at their ends by cross-rods 11.

19 represents rails secured to the ends of the cross-rods 11 and are supported by wheels 18, which are arranged to rotate at the top of the standards 20.

The agitator A is arranged to be moved to and fro in a direction at right angles to the motion of the pan and is moved by any suitable means, such as by the connecting-rod 14 and crank 32. 13 is a pulley for driving the shaft 12, upon which said crank is mounted.

In Fig. 4 I show a modified form of ore-agitator which moves with the pan. This agitator consists of a number of depending pins 25, which are fixed in a frame 24. The said frame is secured to the pan by clasps 28.

In operating my invention the pan and agitator are set in motion and ore which has been previously amalgamated, and therefore contains floured mercury and amalgam, is mixed with a suitable quantity of water and fed through the feed-pipe 33 into the inlet end of the pan. The ore thus mixed passes under the gate 2 and is thereby spread out in a thin layer. The motion of the agitator stirs the ore mixture, and thereby prevents the ore from packing upon the bottom of the pan. The shaking motion of the pan causes the floured mercury and amalgam to settle through the ore gangue upon the amalgamated surface of the pan, and the consequent rubbing of ore upon said surface causes the floured mercury to coalesce and form a flowable body of mercury, the superfluous portion of which readily passes through the amalgamated joints 27 into the grooves 4 and is discharged through the openings 5 into the catch-box 6. The particles of amalgam settle upon the amalgamated bottom of the pan and adhere thereto and may be scraped off said bottom when a sufficient quantity has accumulated. The ore gangue passes out of the pan over the dam 9.

In some instances it is desirable to retain a considerable quantity of mercury upon the amalgamated bottom of the pan to cause the ore to readily float upon the surface of the mercury without rubbing upon or being carried by the pan, and this may be done by closing the openings 5 with plugs 8.

Having described my invention, what I claim as new, and desire to secure by Letters Patent, is—

1. A reciprocating pan having an amalgamated lining and adapted to contain ore and water; amalgamated joints in said lining for the passage of superfluous mercury; and means to agitate the ore.

2. A reciprocating pan; an amalgamated lining in said pan; amalgamated joints in said lining for the passage of mercury; and grooves in said pan beneath said joints.

In testimony whereof I affix my signature in presence of two witnesses.

THOMAS H. HICKS.

Witnesses:
W. G. BURNS,
M. J. BLETZ.